(12) United States Patent
Watanabe et al.

(10) Patent No.: US 10,356,276 B2
(45) Date of Patent: Jul. 16, 2019

(54) IMAGE PROCESSING APPARATUS, IMAGE FORMING APPARATUS, AND COMPUTER READABLE MEDIUM

(71) Applicant: FUJI XEROX CO., LTD., Minato-ku, Tokyo (JP)

(72) Inventors: Tetsuharu Watanabe, Kanagawa (JP); Naoyuki Enomoto, Kanagawa (JP); Yozo Kashima, Kanagawa (JP); Tomohisa Ishikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 57 days.

(21) Appl. No.: 15/375,950

(22) Filed: Dec. 12, 2016

(65) Prior Publication Data

US 2017/0094112 A1    Mar. 30, 2017

Related U.S. Application Data

(63) Continuation of application No. 14/550,368, filed on Nov. 21, 2014, now Pat. No. 9,552,621.

(30) Foreign Application Priority Data

Apr. 21, 2014    (JP) ................................ 2014-087351

(51) Int. Cl.
*G06K 9/00* (2006.01)
*H04N 1/393* (2006.01)
(Continued)

(52) U.S. Cl.
CPC ........... *H04N 1/393* (2013.01); *G06K 9/6203* (2013.01); *G06T 3/40* (2013.01); *H04N 1/00005* (2013.01);
(Continued)

(58) Field of Classification Search
None
See application file for complete search history.

(56) References Cited

U.S. PATENT DOCUMENTS 5,896,470 A    4/1999  Miyaza
6,028,956 A    2/2000  Shustorovich et al.
(Continued)

FOREIGN PATENT DOCUMENTS

CN    101104340 A    1/2008
CN    101564383 A    9/2009
(Continued)

OTHER PUBLICATIONS

Communication dated Jul. 20, 2016, from the State Intellectual Property Office of the P.R.C. in counterpart Chinese application No. 201510009422.X.
(Continued)

*Primary Examiner* — Fred H Hu
(74) *Attorney, Agent, or Firm* — Sughrue Mion, PLLC (57) ABSTRACT

An image processing apparatus includes a reception unit, an acquisition unit, an enlarging/reducing unit, and a detector. The reception unit receives two image data to be compared. The acquisition unit acquires character sizes of characters contained in the two image data received by the reception unit. The enlarging/reducing unit enlarges or reduces the image data received by the reception unit such that the character sizes of the characters contained in the two image data acquired by the acquisition unit coincide with each other. The detector detects a difference between the two image data which have been enlarged or reduced by the enlarging/reducing unit such that the character sizes of the characters contained in the two image data coincide with each other.

12 Claims, 7 Drawing Sheets

(51) Int. Cl.
   *G06T 3/40*    (2006.01)
   *G06K 9/62*    (2006.01)
   *H04N 1/00*    (2006.01)
   *H04N 1/38*    (2006.01)

(52) U.S. Cl.
   CPC ..... *H04N 1/00015* (2013.01); *H04N 1/00039* (2013.01); *H04N 1/38* (2013.01); *H04N 2201/0094* (2013.01)

(56) References Cited

U.S. PATENT DOCUMENTS

| | | | |
|---|---|---|---|
| 6,115,506 A | 9/2000 | Koshinaka | |
| 6,252,984 B1 | 6/2001 | Haneda et al. | |
| 6,473,517 B1 | 10/2002 | Tyan et al. | |
| 6,563,951 B2* | 5/2003 | Fåhraeus | G06K 9/2009 |
| | | | 382/216 |
| 6,747,582 B2 | 6/2004 | Morihara et al. | |
| 6,891,978 B1* | 5/2005 | Takano | G06T 11/60 |
| | | | 382/284 |
| 7,280,695 B2 | 10/2007 | Leung et al. | |
| 7,336,378 B2* | 2/2008 | Ichikawa | H04N 1/3875 |
| | | | 358/1.11 |
| 2005/0262441 A1* | 11/2005 | Yoon | G06F 17/217 |
| | | | 715/201 |
| 2008/0014001 A1 | 1/2008 | Horii | |
| 2008/0199081 A1* | 8/2008 | Kimura | G06K 9/481 |
| | | | 382/190 |
| 2009/0238491 A1 | 9/2009 | Mizutani | |
| 2010/0220356 A1 | 9/2010 | Hamada et al. | |
| 2012/0120444 A1* | 5/2012 | Hirohata | G06K 9/00449 |
| | | | 358/1.15 |
| 2012/0243796 A1 | 9/2012 | Saito | |
| 2012/0281921 A1* | 11/2012 | Dowell | G06T 3/0068 |
| | | | 382/195 |
| 2014/0101526 A1* | 4/2014 | Marsh | G06F 17/2211 |
| | | | 715/229 |
| 2014/0139890 A1* | 5/2014 | Hayama | H04N 1/32144 |
| | | | 358/474 |
| 2015/0015603 A1* | 1/2015 | Fujieda | G06K 9/348 |
| | | | 345/625 |
| 2015/0221077 A1* | 8/2015 | Kawabata | G06T 7/001 |
| | | | 382/141 |
| 2015/0302274 A1* | 10/2015 | Watanabe | G06T 3/40 |
| | | | 382/203 |

FOREIGN PATENT DOCUMENTS

| | | |
|---|---|---|
| CN | 101837688 A | 9/2010 |
| CN | 102693425 A | 9/2012 |
| JP | 3571128 B2 | 9/2004 |
| JP | 2004-312534 A | 11/2004 |
| JP | 2005-134601 A | 5/2005 |
| JP | 2009-165088 A | 7/2009 |
| JP | 2010-130418 A | 6/2010 |
| JP | 2012-004667 A | 1/2012 |

OTHER PUBLICATIONS

Communication dated May 28, 2015 from the Japanese Patent Office in counterpart application No. 2014-087351.

* cited by examiner

IMAGE PROCESSING APPARATUS, IMAGE FORMING APPARATUS, AND COMPUTER READABLE MEDIUM

CROSS-REFERENCE TO RELATED APPLICATIONS

This application is a Continuation of U.S. application Ser. No. 14/550,368, filed Nov. 21, 2014, which is based on and claims priority under 35 USC 119 from Japanese Patent Application No. 2014-087351 filed Apr. 21, 2014, the disclosures of which are incorporated herein by reference in their entirety.

BACKGROUND

Technical Field

The present invention relates to an image processing apparatus, an image forming apparatus, and a recording medium.

SUMMARY

According to an aspect of the present invention, there is provided an image processing apparatus including: a reception unit that receives two image data to be compared; an acquisition unit that acquires character sizes of characters contained in the two image data received by the reception unit; an enlarging/reducing unit that enlarges or reduces the image data received by the reception unit such that the character sizes of the characters contained in the two image data acquired by the acquisition unit coincide with each other; and a detector that detects a difference between the two image data which have been enlarged or reduced by the enlarging/reducing unit such that the character sizes of the characters contained in the two image data coincide with each other.

BRIEF DESCRIPTION OF THE DRAWINGS

An exemplary embodiment of the present invention will be described in detail based on the following figures, wherein.

DETAILED DESCRIPTION

Now, an exemplary embodiment of the present invention will be described in detail below with reference to the drawings.

Figure 1:
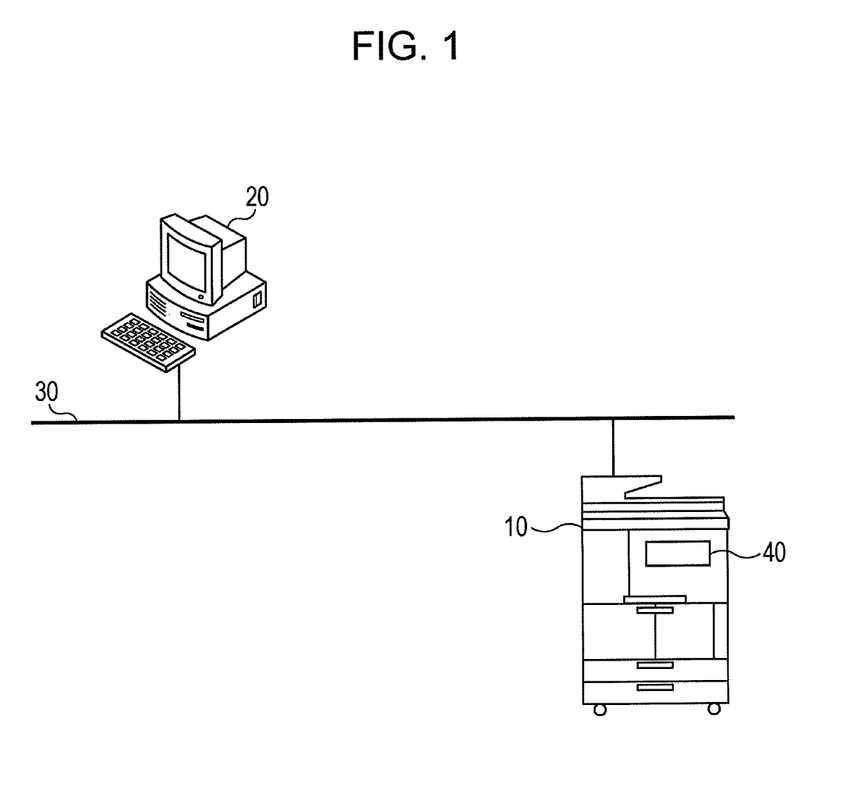
FIG. 1 illustrates an image forming system according to an exemplary embodiment of the present invention.

FIG. 1 illustrates an image forming system according to an exemplary embodiment of the present invention.

In the image forming system according to the first exemplary embodiment of the present invention, as illustrated in FIG. 1, a terminal apparatus 20 and an image forming apparatus 10 are connected to each other via a network 30. The terminal apparatus 20 generates print data, and transmits the generated print data to the image forming apparatus 10 via the network 30. The image forming apparatus 10 receives the print data transmitted from the terminal apparatus 20, and outputs an image matching the print data onto paper. The image forming apparatus 10 is a so-called multifunction device that has plural functions such as a printing function, a scanning function, a copying function, and a facsimile function.

The image forming apparatus 10 may be additionally provided with a difference image generation device 40 as an optional function. The difference image generation device 40 has a function of receiving two image data to be compared, such as new drawing data and old drawing data, for example, detecting a difference between the new drawing data and the old drawing data, and outputting, such as displaying, the detected difference in one image data. For example, the difference image generation device 40 may display differences between the new drawing data and the old drawing data in one image data by displaying a component that was present in the old drawing but has been deleted in the new drawing with thick characters, and displaying a component that was not present in the old drawing but has been added to the new drawing with a dotted line.

Specifically, the difference image generation device 40 first converts the two drawing data to be compared into binary image data, and sequentially compares the corresponding pixels to detect a difference between the two drawing data.

In the case where the two drawings to be compared are provided in a paper form, images are first read using the scanner of the image forming apparatus 10 to convert the images into image data, and the image data are input to the difference image generation device 40 to detect a difference.

The image forming apparatus 10 outputs an image generated on the basis of the difference image data generated by the difference image generation device 40 by printing the image on printing paper or the like.

Figure 2:
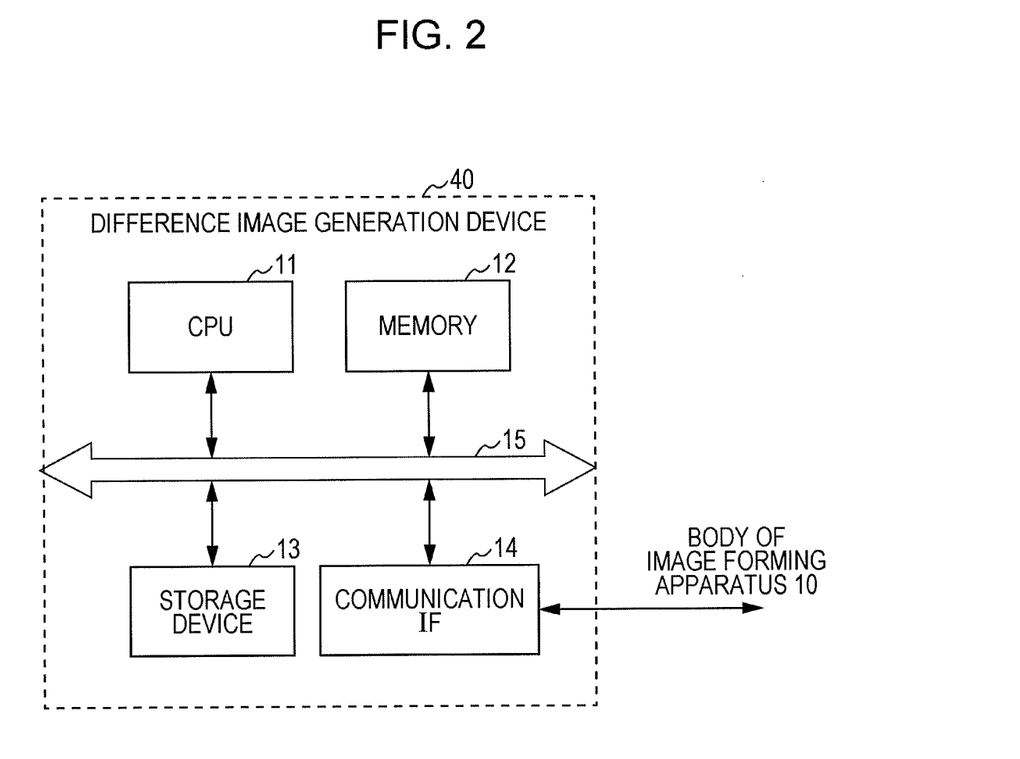
FIG. 2 is a block diagram illustrating the hardware configuration of a difference image generation device 40 according to the exemplary embodiment of the present invention.

Next, the hardware configuration of the difference image generation device 40 in the image forming system according to the exemplary embodiment is illustrated in FIG. 2.

As illustrated in FIG. 2, the difference image generation device 40 includes a central processing unit (CPU) 11, a memory 12, a storage device 13 such as a hard disk drive (HDD), and a communication interface (IF) 14 that transmits and receives data to and from a body of the image forming apparatus 10. Such components are connected to each other via a control bus 15.

The CPU 11 controls operation of the difference image generation device 40 by executing a predetermined process on the basis of a control program stored in the memory 12 or the storage device 13. In the exemplary embodiment, the CPU 11 reads and executes a control program stored in the memory 12 or the storage device 13. However, such a program may be stored in a storage medium such as a CD-ROM to be provided to the CPU 11.

Figure 3:
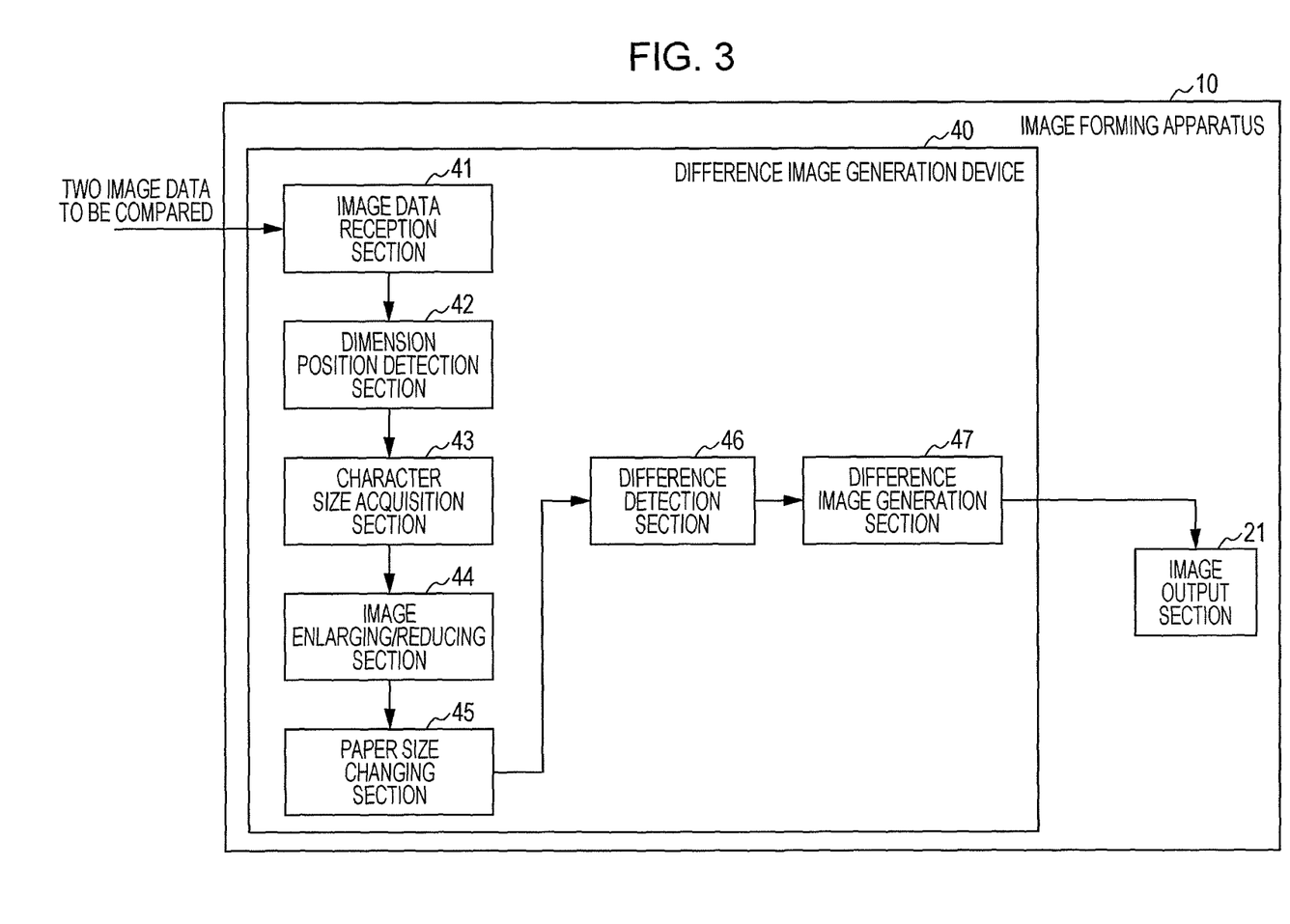
FIG. 3 is a block diagram illustrating the functional configuration of the difference image generation device 40 according to the exemplary embodiment of the present invention.

FIG. 3 illustrates the functional configuration of the difference image generation device 40 implemented by a control program stored in the memory 12 or the storage device 13 and executed by the CPU 11.

As illustrated in FIG. 3, the difference image generation device 40 according to the exemplary embodiment is composed of an image data reception section 41, a dimension position detection section 42, a character size acquisition section 43, an image enlarging/reducing section 44, a paper size changing section 45, a difference detection section 46, and a difference image generation section 47.

The image data reception section 41 receives two image data to be compared read by a scanner (not illustrated) provided to the image forming apparatus 10.

The dimension position detection section 42 acquires the position of dimension values contained in the two image data received by the image data reception section 41.

The character size acquisition section 43 acquires the character sizes of characters contained in the two image data received by the image data reception section 41. The method of acquiring the character size will be discussed in detail later.

The image enlarging/reducing section 44 enlarges or reduces the image data received by the image data reception section 41 such that the character sizes of the characters contained in the two image data acquired by the character size acquisition section 43 coincide with each other.

In the case where the paper sizes for the two image data containing the characters, the character sizes of which acquired by the character size acquisition section 43 have been caused to coincide with each other by the image enlarging/reducing section 44, are different from each other, the paper size changing section 45 changes the paper sizes for the two image data so as to coincide with each other by adding a margin or removing a margin.

The difference detection section 46 detects a difference between the two image data which have been enlarged or reduced by the image enlarging/reducing section 44 such that the character sizes of the characters contained in the two image data coincide with each other. Specifically, as discussed above, the difference detection section 46 compares the two image data to be compared pixel by pixel to detect differences between the two image data.

The difference image generation section 47 generates a difference image that indicates the difference between the two image data detected by the difference detection section 46. In addition, the difference image generation section 47 transmits the generated difference image to an image output section 21 of the image forming apparatus 10. The image output section 21 outputs the received difference image by printing the difference image on printing paper.

Figure 4:
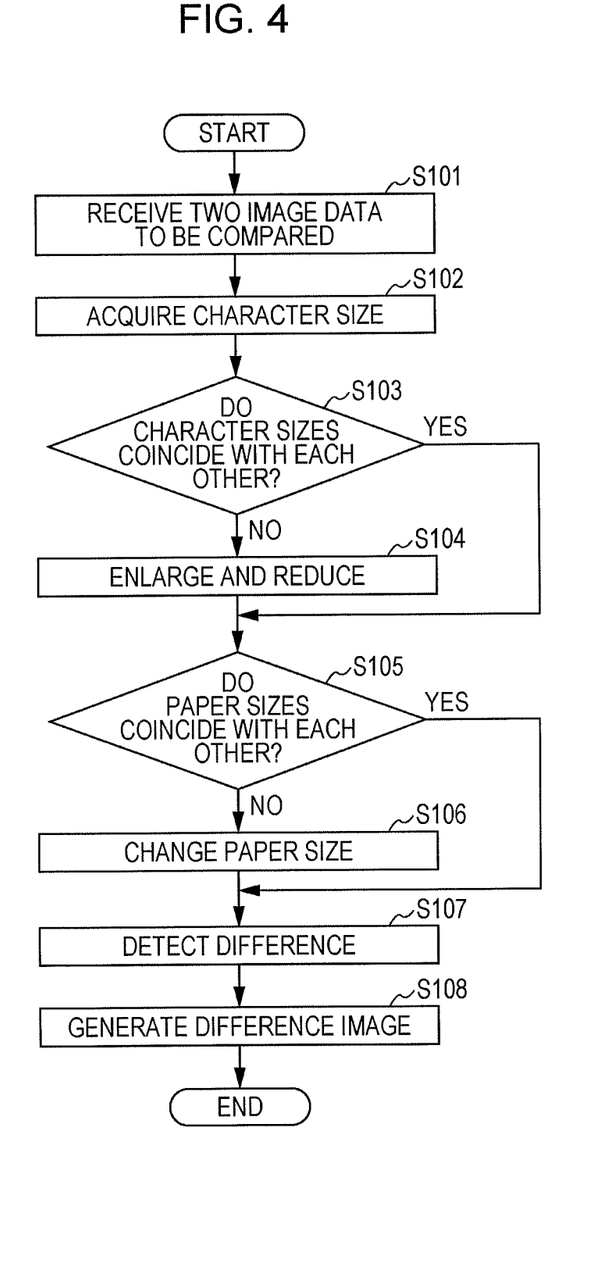
FIG. 4 is a flowchart illustrating the flow of a process performed by the difference image generation device 40 according to the exemplary embodiment of the present invention.

Next, operation of the image forming system according to the exemplary embodiment will be described in detail below reference to the flowchart of FIG. 4.

First, the image data reception section 41 receives two image data to be compared read by a scanner (not illustrated) provided to the image forming apparatus 10 (step S101). In the exemplary embodiment, the image data reception section 41 receives two image data to be compared read by the scanner provided to the image forming apparatus 10. However, the image data reception section 41 may receive two image data to be compared transmitted from the terminal apparatus 20 via the network 30.

Specifically, the image data reception section 41 receives drawing (old drawing) data before being corrected because of a design change, rescaling, or the like and drawing (new drawing) data after being corrected.

Next, the character size acquisition section 43 acquires the character sizes of characters contained in the two image data to be compared received by the image data reception section 41 (step S102). At this time, the dimension position detection section 42 detects the dimension position by a method according to the related art. In the case where dimension values are contained in the two image data, the character size acquisition section 43 acquires the character sizes of the dimension values at the detected position.

The character sizes of the dimension values are less likely to be changed because of a correction or the like other than rescaling of the image data. Therefore, the two image data are more likely to be set to the same scale by causing the character sizes of the dimension values contained in the two image data to coincide with each other than by causing the character sizes of characters other than the dimension values to coincide with each other. Thus, in the case where the two image data contain dimension values, the character sizes of the dimension values may be used.

Then, the image enlarging/reducing section 44 determines whether or not the character sizes of the characters contained in the two image data acquired by the character size acquisition section 43 coincide with each other (step S103).

Then, in the case where the character sizes of the characters contained in the two image data do not coincide with each other (no in step S103), the image enlarging/reducing section 44 enlarges or reduces the image data such that the character sizes of the characters acquired by the character size acquisition section 43 coincide with each other (step S104).

In the case where the character sizes of the characters contained in the two image data coincide with each other (yes in step S103), the process proceeds to step S105 without the image enlarging/reducing section 44 enlarging or reducing the two image data.

Next, the paper size changing section 45 determines whether or not the paper sizes for the two image data containing the characters, the character sizes of which acquired by the character size acquisition section 43 have been caused to coincide with each other by the processes in step S103 and step S104, coincide with each other (step S105).

Then, in the case where the paper sizes for the two image data containing the characters, the character sizes of which have been caused to coincide with each other, do not coincide with each other (no in step S105), the paper size changing section 45 changes the paper sizes for the two image data so as to coincide with each other by adding a margin or removing a margin (step S106).

In the case where the paper sizes for the two image data containing the characters, the character sizes of which have been caused to coincide with each other, coincide with each other (yes in step S105), meanwhile, the process proceeds to step S107.

Then, the difference detection section 46 detects a difference between the two image data, the paper sizes for which have been caused to coincide with each other by the processes in step S105 and step S106 (step S107). For example, the difference detection section 46 detects changes between the old drawing data and the new drawing data due to a correction.

Finally, the difference image generation section 47 generates a difference image that indicates the difference between the two image data detected in step S107, and transmits the generated difference image to the image output section 21 of the image forming apparatus 10 (step S108). The generated difference image may be transmitted to the terminal apparatus 20 via the network 30.

Next, specific examples of the process performed by the difference image generation device 40 and a method for the character size acquisition section 43 to acquire character sizes according to the exemplary embodiment will be described in detail with reference to FIGS. 5A to 7C.

Figure 5A:
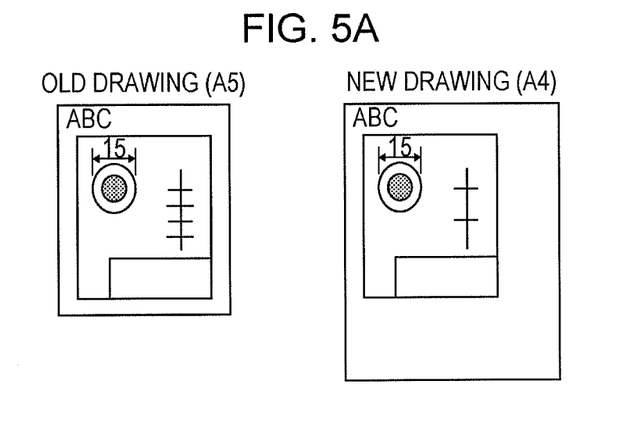
FIGS. 5A to 5C illustrate an example of the process performed by the difference image generation device 40 to acquire the character size of a dimension value contained in new drawing data and old drawing data according to the exemplary embodiment of the present invention.

First, a case where a difference image between old drawing data and new drawing data obtained by making a correction to the old drawing data and thereafter changing the paper size of the old drawing data is generated will be described with reference to FIGS. 5A to 5C. As illustrated in FIG. 5A, the old drawing data and the new drawing data are on the same scale, but the paper sizes for the old drawing data and the new drawing data are different from each other. For example, the paper size for the old drawing data is A5, and the paper size for the new drawing data is A4.

First, the dimension position detection section 42 detects the dimension position by a method according to the related art. Specifically, the dimension position detection section 42 detects the position of dimension values in the drawings on the basis of extension lines contained in each of the new drawing data and the old drawing data received by the image data reception section 41.

Next, because each of the old drawing data and the new drawing data contains a dimension value as illustrated in FIG. 5A, the character size acquisition section 43 acquires the character sizes of the dimension values contained in each of the old drawing data and the new drawing data at the position detected by the dimension position detection section 42. In the example of FIG. 5A, the character sizes of the dimension values contained in each of the old drawing data and the new drawing data are the same as each other.

Since the character sizes of the dimension values contained in each of the old drawing data and the new drawing data acquired by the character size acquisition section 43 are the same as each other, the image enlarging/reducing section 44 does not enlarge or reduce the old drawing data or the new drawing data.

Figure 5B:
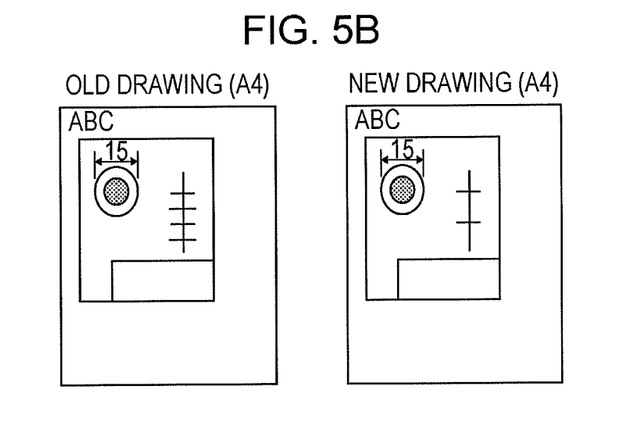
Figure 5C:
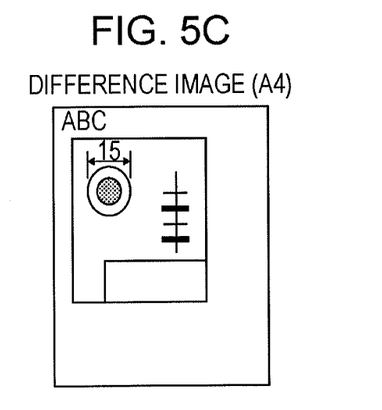

Next, the paper size changing section 45 changes the paper size for the old drawing data so as to cause the paper size for the old drawing data and the paper size for the new drawing data to coincide with each other by adding a margin to the old drawing data as illustrated in FIG. 5B. Specifically, a margin is added to the old drawing data to change the paper size for the old drawing data from A5 to A4.

Then, the difference detection section 46 detects a difference between the old drawing data, the paper size for which has been changed by the paper size changing section 45, and the new drawing data. Further, the difference image generation section 47 generates a difference image in which the difference detected by the difference detection section 46 is indicated with thick characters as illustrated in FIG. 5C.

Figure 6A:
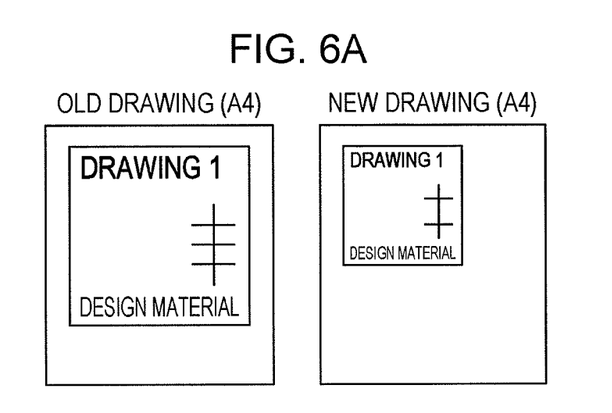
FIGS. 6A to 6C illustrate an example of the process performed by the difference image generation device 40 to acquire the character size of the largest character contained in the new drawing data and the old drawing data according to the exemplary embodiment of the present invention.

Next, a case where a difference image between old drawing data and new drawing data obtained by making a correction to the old drawing data and thereafter reducing the drawing is generated will be described with reference to FIGS. 6A to 6C. As illustrated in FIG. 6A, the paper sizes for the old drawing data and the new drawing data are the same as each other, but the old drawing data and the new drawing data are on different scales.

First, the dimension position detection section 42 detects the dimension position in the new drawing data and the old drawing data. Because the old drawing data and the new drawing data do not contain a dimension value as illustrated in FIG. 6A, the character size acquisition section 43 acquires the character size of the largest character, for the characters contained in each of the old drawing data and the new drawing data. In the example of FIG. 6A, the character size of the characters "DRAWING 1" is the largest for the characters contained in the old drawing data and the new drawing data, and therefore the character size acquisition section 43 acquires the character sizes of "DRAWING 1" contained in each of the old drawing data and the new drawing data.

Figure 6B:
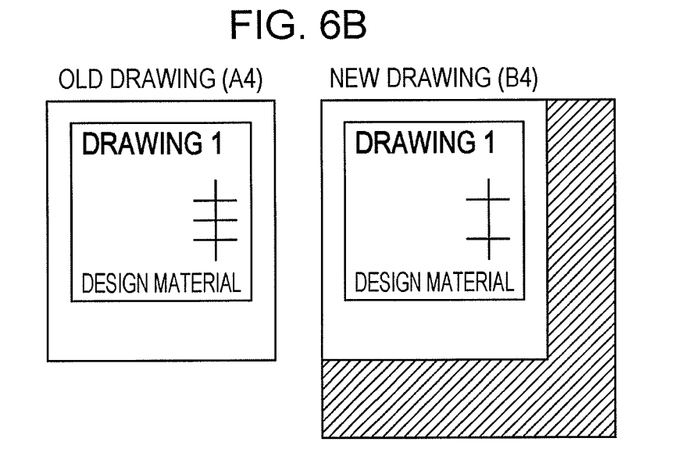
Figure 6C:
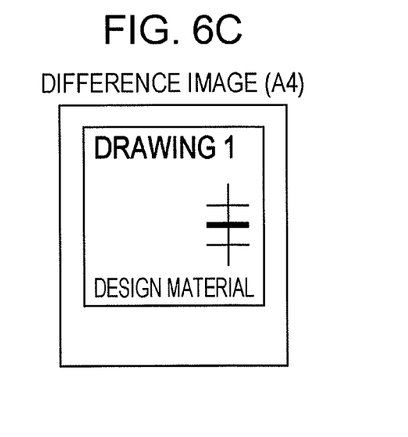

Then, because the character sizes of "DRAWING 1" contained in each of the old drawing data and the new drawing data are different from each other, the image enlarging/reducing section 44 enlarges the new drawing data such that the character size of "DRAWING 1" contained in the old drawing data and the character size of "DRAWING 1" contained in the new drawing data coincide with each other as illustrated in FIG. 6B. For example, in the case where the character size of "DRAWING 1" in the old drawing data is 24 points and the character size of "DRAWING 1" in the new drawing data is 14 points, the image enlarging/reducing section 44 enlarges the new drawing data such that the character size of "DRAWING 1" in the new drawing data becomes 24 points.

Next, because the paper size for the new drawing data has been made larger than the paper size for the old drawing data by enlarging the new drawing data, the paper size changing section 45 changes the paper sizes for the old drawing data and the new drawing data such that the paper sizes for the old drawing data and the new drawing data coincide with each other by removing a margin, which is the portion indicated by oblique lines, from the new drawing data as illustrated in FIG. 6B. For example, in the case where the paper size for the old drawing data is A4 and the paper size for the new drawing data has been set to B4 by enlarging the new drawing data, the paper size changing section 45 changes the paper size for the new drawing data from B4 to A4 by removing a margin from the new drawing data.

Then, the difference detection section 46 detects a difference between the old drawing data, the paper size for which has been changed by the paper size changing section 45, and the new drawing data. Further, the difference image generation section 47 generates a difference image in which the difference detected by the difference detection section 46 is indicated with thick characters as illustrated in FIG. 6C.

Figure 7A:
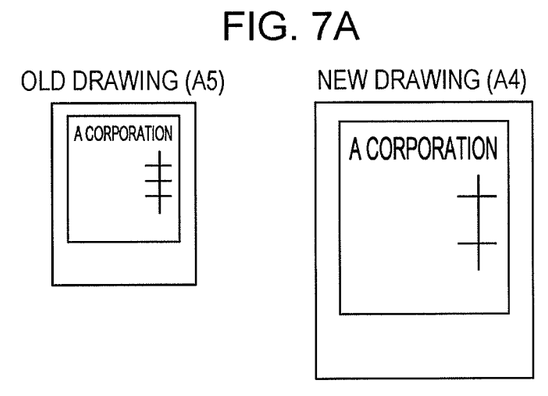
FIGS. 7A to 7C illustrate an example of the process performed by the difference image generation device 40 to acquire the character size of a character corresponding to a character code determined in advance contained in the new drawing data and the old drawing data according to the exemplary embodiment of the present invention.

Next, a case where a difference image between old drawing data and new drawing data obtained by making a correction to the old drawing data and thereafter enlarging the drawing to change the paper size is generated will be described with reference to FIGS. 7A to 7C. As illustrated in FIG. 7A, the old drawing data and the new drawing data are different from each other in drawing scale and paper size.

First, the dimension position detection section 42 detects the dimension position in the new drawing data and the old drawing data. Because the old drawing data and the new drawing data do not contain a dimension value as illustrated in FIG. 7A, the character size acquisition section 43 acquires the character size of a character corresponding to a character code designated in advance, for the characters contained in each of the old drawing data and the new drawing data. In the example of FIG. 7A, the character size acquisition section 43 acquires the character size of "A CORPORATION", which is contained in each of the old drawing data and the new drawing data, as the character corresponding to the character code designated in advance.

A character code contained in the new drawing data and the old drawing data may be detected by using optical character recognition (OCR) when the old drawing data and the new drawing data are read by a scanner provided to the image forming apparatus 10. In this case, characters contained in the new drawing data and the old drawing data and the character size of the characters are recognized through the OCR to acquire the character codes of the recognized characters, a character code designated in advance is specified from the acquired character codes, and the character size acquisition section 43 acquires the character size of the character corresponding to the specified character code.

Figure 7B:
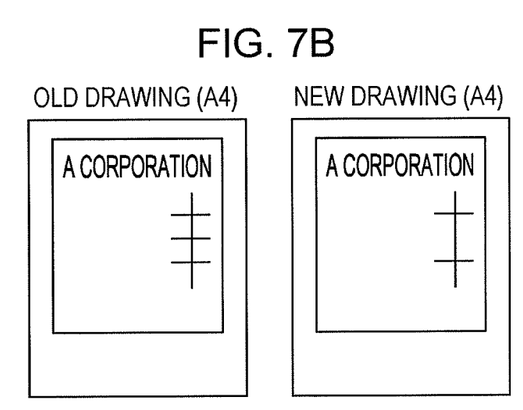
Figure 7C:
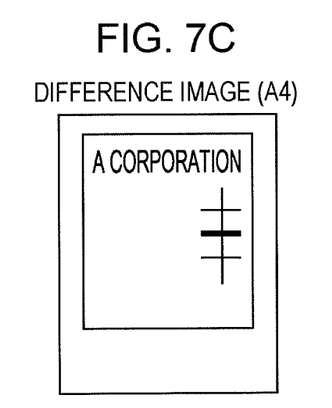

Since the character sizes of "A CORPORATION" contained in each of the old drawing data and the new drawing data are different from each other, the image enlarging/reducing section 44 enlarges the old drawing data such that the character size of "A CORPORATION" contained in the old drawing data and the character size of "A CORPORATION" contained in the new drawing data coincide with each other as illustrated in FIG. 7B. For example, in the case where the character size of "A CORPORATION" contained in the old drawing data is 12 points and the character size of "A CORPORATION" contained in the new drawing data is 18 points, the image enlarging/reducing section 44 enlarges the old drawing data such that the character size of "A CORPORATION" in the old drawing data becomes 18 points.

Next, the paper size changing section 45 does not change the paper size in the case where the paper sizes for the old drawing data and the new drawing data coincide with each other after the old drawing data are enlarged as illustrated in FIG. 7B.

Then, the difference detection section 46 detects a difference between the old drawing data, which has been enlarged by the image enlarging/reducing section 44, and the new drawing data. Further, the difference image generation section 47 generates a difference image in which the difference detected by the difference detection section 46 is indicated with thick characters as illustrated in FIG. 7C.

In the specific examples described above, the image enlarging/reducing section 44 enlarges one of the two image data such that the character sizes of the characters contained in the two image data coincide with each other. However, the image enlarging/reducing section 44 may reduce one of the two image data such that the character sizes of the characters contained in the two image data coincide with each other. Further, the image enlarging/reducing section 44 may enlarge or reduce both of the two image data such that the character sizes of the characters contained in the two image data coincide with each other.

In the specific examples described above, in addition, the character size acquisition section 43 acquires the character size of a dimension value, the character size of the largest character, or the character size of a character corresponding to a character code designated in advance, for the characters contained in the two image data. However, the present invention is not limited thereto. Specifically, the character size acquisition section 43 may acquire the character size of the smallest character, the character size of a character corresponding to a character code that appears the most frequently, or the character size that is used the most frequently, for the characters contained in the two image data. Further, the character size acquisition section 43 may acquire the character size of characters that meet conditions set as desired in accordance with information received from the terminal apparatus 20.

In the specific examples described above, further, the detected difference is indicated with thick characters in the difference image. However, the present invention is not limited thereto as long as the difference between the two image data may be visually grasped. For example, the detected difference may be indicated with a change in color.

In the exemplary embodiment, new drawing data and old drawing data are used as the two image data to be compared. However, the image data to be compared are not limited to drawing data.

In the exemplary embodiment, the dimension position detection section 42 detects a dimension position in the case where the two image data to be compared do not contain a dimension value. However, it may be determined in advance whether or not the image data contain a dimension value. In this case, the dimension position detection section 42 may detect a dimension value only in the case where the image data contain a dimension value.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one hardware processor configured to implement:
   a reception unit configured to receive two image data to be compared, each of the two image data representing an image;
   an acquisition unit configured to acquire character sizes of characters contained in each of the two image data received by the reception unit;
   an enlarging/reducing unit configured to enlarge or reduce the entire image of at least one of the two image data received by the reception unit such that the character sizes of the characters contained in each of the two image data acquired by the acquisition unit coincide with each other; and
   a detector configured to detect a difference between the two image data at least one of which has been enlarged or reduced by the enlarging/reducing unit such that the character sizes of the characters contained in each of the two image data coincide with each other.

2. The image processing apparatus according to claim 1, wherein the at least one hardware processor is further configured to implement:
   a changing unit configured to change the paper sizes for the two image data so as to coincide with each other by adding a margin or removing a margin, in a case where paper sizes for the two image data containing the characters, of which the character sizes acquired by the acquisition unit have been caused to coincide with each other by the enlarging/reducing unit, are different from each other.

3. The image processing apparatus according to claim 1, wherein the acquisition unit is configured to acquire a character size of a largest character, or a character size of a smallest character, for the characters contained in the two image data.

4. The image processing apparatus according to claim 1, wherein the acquisition unit is configured to acquire a character size of a character corresponding to a character code designated in advance, for the characters contained in the two image data.

5. The image processing apparatus according to claim 1, wherein the acquisition unit is configured to acquire a character size of a character corresponding to a character code that appears most frequently, or a character size that is used most frequently, for the characters contained in the two image data.

6. The image processing apparatus according to claim 1, wherein the at least one hardware processor is further configured to implement:
a position acquisition unit configured to acquire a position of a dimension value contained in the two image data,
wherein the acquisition unit is configured to acquire a character size of the dimension value at the position acquired by the position acquisition unit.

7. The image processing apparatus according to claim 1, wherein the at least one hardware processor is further configured to implement:
a generation unit configured to generate a difference image that indicates the difference between the two image data detected by the detector.

8. The image processing apparatus according to claim 1, wherein the character sizes of the characters contained in each of the two image data acquired by the acquisition unit coincide with each other such that the character sizes of the characters contained in each of the two image data are equal.

9. The image processing apparatus according to claim 1, wherein the difference is a portion of the entire image that is separated from the characters.

10. The image processing apparatus according to claim 1, wherein the entire image is enlarged or reduced in response to determining that a largest character size in the entire image is different than a largest character size in another entire image of another of the two image data.

11. A non-transitory computer readable medium storing a program causing a computer to execute a process comprising:
receiving two image data to be compared, each of the two image data representing an image;
acquiring character sizes of characters contained in each of the received two image data;
enlarging or reducing the entire image of at least one of the two received image data such that the character sizes of the characters contained in each of the acquired two image data coincide with each other; and
detecting a difference between the two image data at least one of which has been enlarged or reduced such that the character sizes of the characters contained in each of the two image data coincide with each other.

12. The non-transitory computer readable medium according to claim 11, wherein the character sizes of the characters contained in each of the acquired two image data coincide with each other such that the character sizes of the characters contained in each of the acquired two image data are equal.

* * * * *